US010613827B2

(12) United States Patent
Cordell et al.

(10) Patent No.: US 10,613,827 B2
(45) Date of Patent: Apr. 7, 2020

(54) CONFIGURATION FOR SIMULATING A VIDEO REMOTE INTERPRETATION SESSION

(71) Applicant: Language Line Services, Inc., Monterey, CA (US)

(72) Inventors: Jeffrey Cordell, Carmel, CA (US); Lindsay D'Penha, Carmel, CA (US); Julia Berke, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 3 days.

(21) Appl. No.: 15/913,894

(22) Filed: Mar. 6, 2018

(65) Prior Publication Data

US 2019/0278561 A1    Sep. 12, 2019

(51) Int. Cl.
```
G06F 3/0484    (2013.01)
G06F 3/16      (2006.01)
G06F 3/0481    (2013.01)
G06F 9/451     (2018.01)
G06F 40/58     (2020.01)
```
(52) U.S. Cl.
CPC .......... *G06F 3/167* (2013.01); *G06F 3/04817* (2013.01); *G06F 3/04845* (2013.01); *G06F 9/453* (2018.02); *G06F 40/58* (2020.01)

(58) Field of Classification Search
CPC ................ G06F 17/289; G06F 3/0482; H04M 2203/2061
See application file for complete search history.

(56) References Cited

U.S. PATENT DOCUMENTS

| | | | | |
|---|---|---|---|---|
| 7,429,989 B2 * | 9/2008 | Kang | ............... | H04M 1/72544 345/473 |
| 8,601,379 B2 * | 12/2013 | Marks | ..................... | A63F 13/06 715/757 |
| 9,357,174 B2 * | 5/2016 | Li | ..................... | H04M 1/72544 |
| 9,460,541 B2 * | 10/2016 | Li | .......................... | H04N 7/157 |
| 10,262,125 B2 * | 4/2019 | Manabe | ................. | G06F 21/32 |
| 2002/0140732 A1 * | 10/2002 | Tveskov | ............... | G09B 19/04 715/763 |
| 2010/0060647 A1 * | 3/2010 | Brown | .................... | G06T 13/40 345/473 |

(Continued)

*Primary Examiner* — Scott T Baderman
*Assistant Examiner* — Mario M Velez-Lopez
(74) *Attorney, Agent, or Firm* — Patent Ingenuity, P.C.; Samuel K. Simpson

(57) ABSTRACT

A configuration receives, with a processor, a request for a voice-based, human-spoken language interpretation from a first human-spoken language to a second human-spoken language. Further, the configuration routes, with the processor, the request to a device associated with a remotely-located human interpreter. In addition, the configuration receives, with the processor, audio in the first human-spoken language from a telecommunication device. The configuration also augments, in real-time with the processor, the audio with one or more visual features corresponding to the audio. Further, the configuration sends, with the processor, the augmented audio to the device associated with the human interpreter for the voice-based, human-spoken language interpretation to be based on the augmented audio in a simulated video remote interpretation session.

9 Claims, 9 Drawing Sheets

(56) References Cited

U.S. PATENT DOCUMENTS

| | | | | |
|---|---|---|---|---|
| 2010/0153858 A1* | 6/2010 | Gausman | ............ | G06Q 10/101 |
| | | | | 715/757 |
| 2011/0077934 A1* | 3/2011 | Kanevsky | ............ | G06F 17/289 |
| | | | | 704/3 |
| 2011/0169927 A1* | 7/2011 | Mages | ................ | G06F 3/04815 |
| | | | | 348/51 |
| 2012/0310392 A1* | 12/2012 | Abuelsaad | ............ | G06T 13/205 |
| | | | | 700/94 |
| 2014/0218459 A1* | 8/2014 | Wenlong | ............ | H04N 21/4223 |
| | | | | 348/14.01 |
| 2015/0077507 A1* | 3/2015 | Kiet | ........................ | G06Q 40/08 |
| | | | | 348/14.08 |
| 2018/0157901 A1* | 6/2018 | Arbatman | .......... | G06K 9/00315 |

* cited by examiner

CONFIGURATION FOR SIMULATING A VIDEO REMOTE INTERPRETATION SESSION

BACKGROUND

1. Field

This disclosure generally relates to the field of language interpretation. More particularly, the disclosure relates to interpretation from a first human-spoken language to a second human-spoken language.

2. General Background

Conventional configurations may allow users speaking different human-spoken languages to communicate with each other via a human interpreter of such human-spoken languages. For example, a first human user may speak a first human-spoken language (i.e., a language that is traditionally spoken by a group of people originating from a particular geographic location, country, or region) such as English; further, a second human user may speak a second human-spoken language such as Spanish.

In order for the first human user and the second human user to communicate, conventional configurations may utilize a telecommunications network to provide the human users (via one or more telecommunication devices) with access to a human-spoken language interpreter that understands both human-spoken languages; such language interpretation service is typically referred to as over-the-phone interpretation ("OPI").

Accordingly, conventional OPI configurations provide users with a remote voice-based interpretation of a communication between two human-spoken languages. Given the remoteness between the human language interpreter and the human users, the human language interpreter has to rely on auditory cues (e.g., vocal tone), which occur during the voice-based communication between the human users, for performing the voice-based, human-spoken language interpretation. As a result, the human language interpreter performs a voice-based human-spoken language interpretation according to a limited set of data, which limits the efficacy of the voice-based, human-spoken language interpretation.

SUMMARY

A configuration receives, with a processor, a request for a voice-based, human-spoken language interpretation from a first human-spoken language to a second human-spoken language. Further, the configuration routes, with the processor, the request to a device associated with a remotely-located human interpreter. In addition, the configuration receives, with the processor, audio in the first human-spoken language from a telecommunication device. The configuration also augments, in real-time with the processor, the audio with one or more visual features corresponding to the audio. Further, the configuration sends, with the processor, the augmented audio to the device associated with the human interpreter for the voice-based, human-spoken language interpretation to be based on the augmented audio in a simulated video remote interpretation session. Alternatively, a remotely-located machine interpreter may be used instead of the remotely-located human interpreter.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1A:
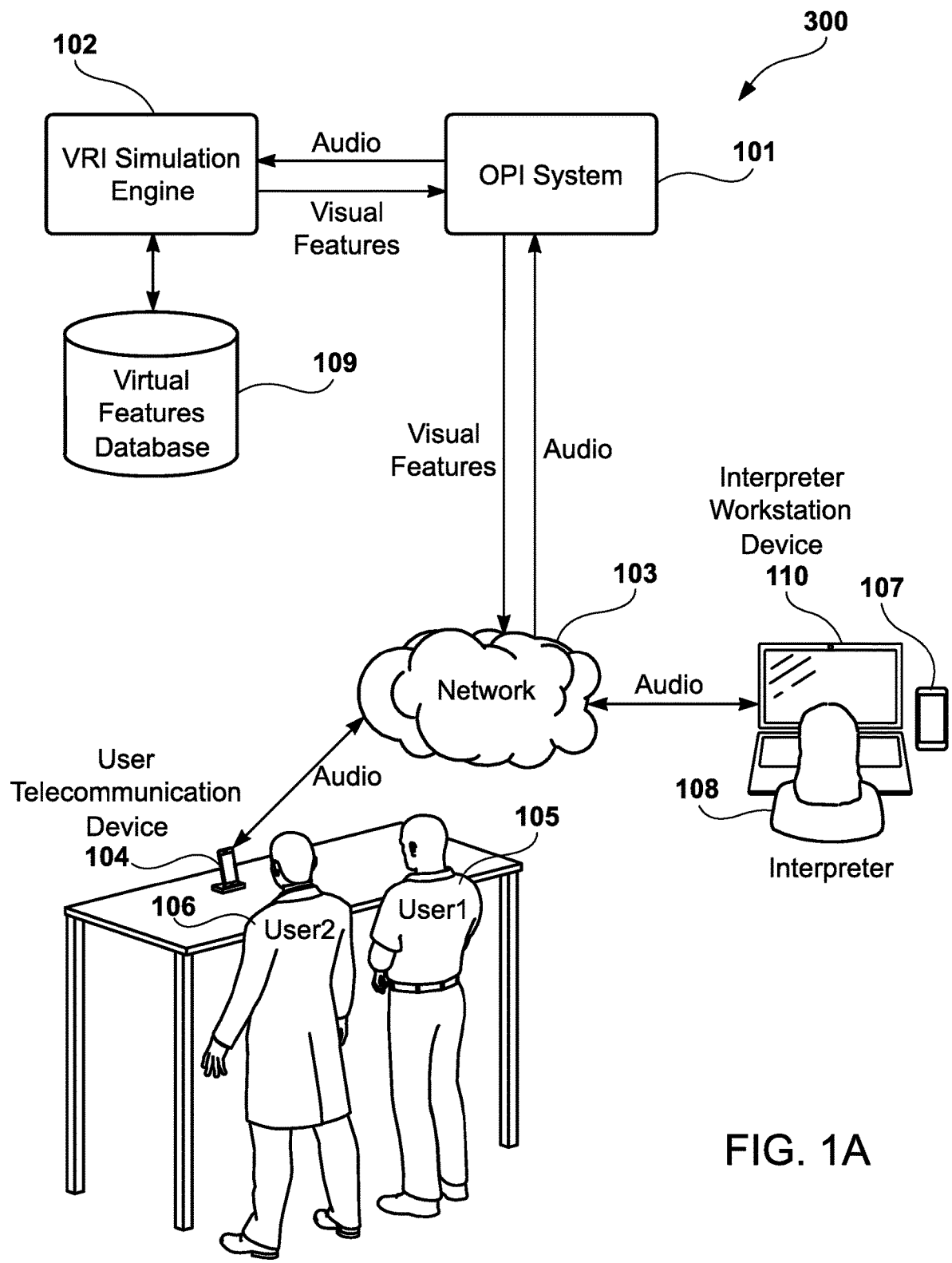
FIG. 1A illustrates a video remote interpretation ("VRI") simulation configuration that is utilized to simulate a VRI session by augmenting an OPI session with one or more visual features.

A configuration is provided to simulate a VRI session for the interpretation between two human-spoken languages. The VRI session is simulated by augmenting a remote, voice-based interpretation session with one or more visual features that correspond to one or more participants in the remote, voice-based interpretation (i.e., the interpreter, first user, and/or second user). Examples of the visual features include, but are not limited to, facial expressions, eyebrow raises, hand gestures, shoulder shrugs, etc. Accordingly, the human language interpreter is able to correlate a word, or phrase, which is spoken by a user during the voice-based communication, with a visual cue. As one word in the first human-spoken language may have a variety of different meanings in the second human-spoken language, the simulated VRI session allows the human language interpreter to select—through visual cues correlated with spoken words—an optimal word or phrase in the second human-spoken language. Similarly, the users may view the visual cues provided by the human language interpreter to determine whether the human language interpreter is understanding what is being understood by the user.

In one embodiment, the human-spoken language interpretation is performed by a human language interpreter. Accordingly, the VRI session may be simulated by manipulating an image (e.g., pre-captured image, avatar, emoji, etc.) to convey visual cues corresponding to the intended meaning (e.g., via emphasis or lack of emphasis). In another embodiment, the human-spoken language interpretation is performed by a machine interpreter. For example, an artificial intelligence ("AI")" system may be trained to not only interpret (during a voice-based communication) words from a first human-spoken language to a second human-spoken language but also select visual cues (e.g., from a database) that optimally correlate with the interpreted words.

In contrast with previous OPI configurations that were limited to auditory cues, the VRI simulation configuration augments voice-based, human-spoken language interpretation with visual features to provide improved language interpretations. As some users may not have telecommunications devices that are capable of an actual VRI session, may not be in a location conducive to a VRI session, or may have privacy concerns, the VRI simulation configuration allows for an OPI session with visual cues in addition to auditory cues.

In one embodiment, the voice-based, human-spoken language interpretation is performed in real-time, or substantially real-time (i.e., as defined to be within a human-unperceivable threshold range such as from one millisecond to sixty seconds) during the voice-based communication between the users. In another embodiment, the VRI simulation is performed in real-time, or substantially real-time, during the voice-based communication between the users.

In yet another embodiment, the VRI simulation is performed in real-time, or substantially real-time during the voice-based, human-spoken language interpretation. In other words, the image corresponding to the interpreter or user may be manipulated in real-time, or substantially real-time, so that the recipient of the voice-based word or phrase observer a visual feature correlated with that word or phrase as if the image of the interpreter or user is performing that visual feature when speaking.

Accordingly, the delivery channel for the voice-based communication and voice-based interpretation is audio, but that audio channel is augmented with visual features to provide the impression that the delivery channel is video.

The VRI simulation configuration improves the functioning of a computer as it improves the accuracy of machine-based language-interpretations. For example, an AI system does not understand the context of a conversation if the AI system is just interpreting word-for-word. By conveying visual cues with words and/or phrases delivered via audio, an AI system provides a more accurate language interpretation than if just based on audio interpretation. Further, a computer is improved to provide context that would not otherwise be present in a telecommunication system that provides OPI.

In addition, the VRI simulation configuration improves the functioning of a computer by reducing the memory requirements and improving the processing speed of the computer. For example, an actual VRI session utilizes significant network bandwidth and data storage. In contrast, the VRI simulation configuration manipulates an avatar or image; such avatar or image manipulation is significantly less bandwidth-intensive than capturing, storing, and transferring actual video content. Therefore, the VRI simulation configuration has reduced memory requirements in comparison with actual VRI configurations. Further, the VRI simulation configuration may transfer smaller amounts of data via a computerized network than actual VRI configurations—resulting in reduced network latency and improved processing speeds of devices receiving the VRI simulation data.

FIG. 1A illustrates a VRI simulation configuration 100 that is utilized to simulate a VRI session by augmenting an OPI session with one or more visual features. The VRI simulation configuration 100 includes an OPI system 101 that utilizes a VRI simulation engine 102 to simulate a VRI session by augmenting an OPI session with visual features from a visual features database 109. The OPI system 101 allows an OPI session to be established via a network 103. A user telecommunication device 104 (e.g., smartphone, telephone with image rendering capability, tablet device, smartwatch, or wearable device) communicates with an interpreter telecommunication device 107 (having similar capabilities as the user telecommunication device) via the network 103. The interpreter 108 may utilize an interpreter workstation 110 in conjunction with, or as an integrated machine that includes, the interpreter telecommunication device 107.

In one embodiment, the users 105 and 106 both utilize the user telecommunication device 104 to communicate with the interpreter communication device 107 through the network 103. For example, the first user 105 may be a Spanish-speaking patient in the same room as the second user 106, who is an English-speaking medical professional. The first user 105 and the second user 106 then take turns speaking in their respective languages via the user telecommunication device 104 so that the interpreter 108 may listen via the interpreter telecommunication device 107. The OPI system 101 also receives the audio, which is then sent by the OPI system 101 to the VRI simulation engine 102. Further, the VRI simulation engine 102 retrieves one or more visual features, which correlate to the voice data provided form the user telecommunication device 104, from the visual features database 109. The VRI simulation engine 102 then sends the visual features to the OPI system 101, which then sends the one or more visual features to the interpreter communication device 107 for augmentation with the audio. Alternatively, the OPI system 101 or the VRI simulation engine 102 may augment the audio with the one or more visual features so that the augmented audio may be sent to the interpreter telecommunication device 107.

Figure 1B:
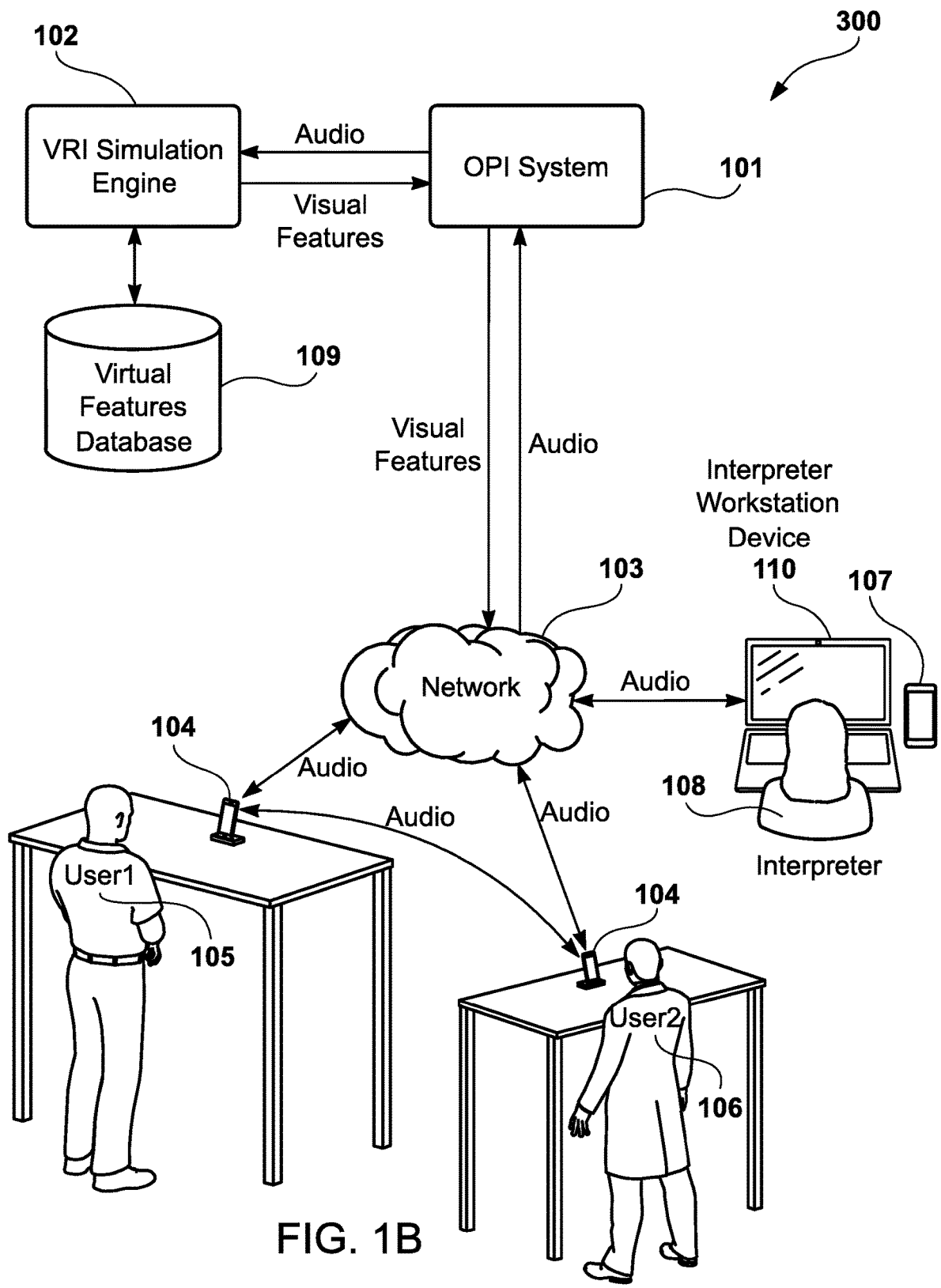
FIG. 1B, the users each have a user telecommunication device.

In another embodiment, as illustrated in FIG. 1B, the users 105 and 106 each have a user telecommunication device. For example, the users 105 and 106 may be remotely situated from one another. Accordingly, the users 105 and 106 may each remotely connect with each other and with the interpreter 108. Further, the VRI simulation may be displayed on each of the user devices 104 in addition to the interpreter telecommunication device 107.

Even though the configurations illustrated in FIGS. 1A and 1B illustrate the VRI simulation engine 102 being stored and utilized at a server, the VRI simulation engine 102 may be stored locally instead. For instance, in another embodiment, the VRI simulation engine 102 may be stored on one or more of the devices participating in the OPI session. For example, the VRI simulation engine 102 may be stored on the user telecommunication device 104 and the interpreter telecommunication device 107. Each device may then perform its own local augmentation of visual features (stored locally or obtained from remote visual features database 109).

Figure 2A:
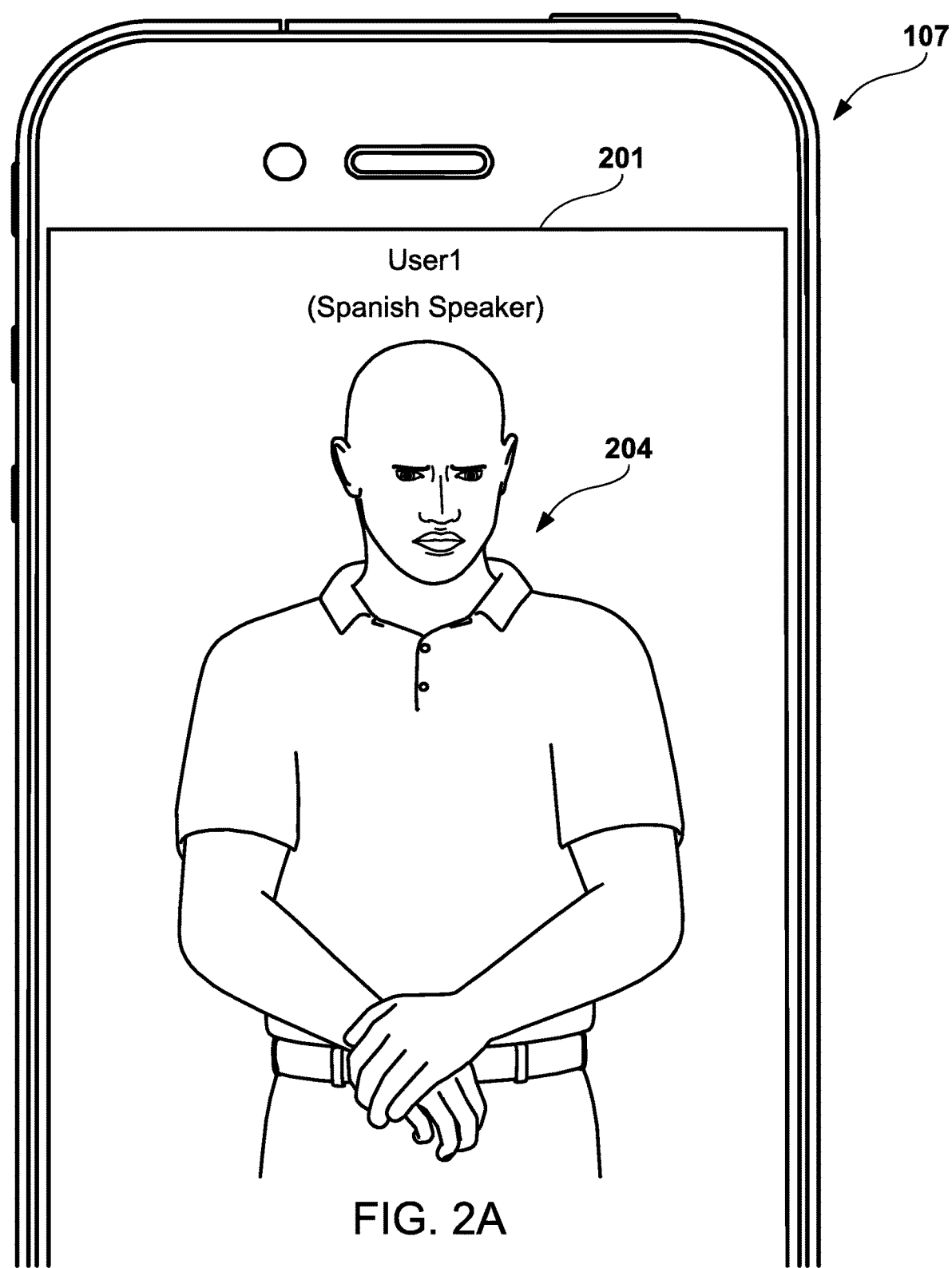
FIG. 2A illustrates an example of a display screen of the telecommunication device that renders a simulated VRI session as illustrated in FIGS. 1A and 1B.

FIG. 2A illustrates an example of a display screen 201 of the telecommunication device 107 that renders a simulated VRI session as illustrated in FIGS. 1A and 1B. The display screen 201 may be integrated within, or in operable communication with, the interpreter telecommunication device 107.

The display screen 201 displays a visual feature corresponding to the audio generated by the first user 105 so that the interpreter 108 may view the visual feature in real-time, or in substantially real-time, while listening to the audio. In one embodiment, the VRI simulation engine 102 performs an audio analysis on the audio to determine what visual feature should be selected from the visual features database 109. For example, the VRI simulation engine 102 may determine that the first user 105 is Spanish-speaking and that the tone associated with the audio is somber. For example the first user 105 may be asking the second user 106, who is an English-speaking medical professional, about a health condition. Accordingly, the VRI simulation engine 102 selects form the visual features database 109 a facial expression that connotes concern, as illustrated by FIG. 2A. In other words, the VRI simulation engine 102 utilizes a rules-based approach to analyze the content of the audio received (i.e., type of question, substance of question, profession of interlocutor, etc.) and the audio inflection (e.g., audio volume, tone, etc.) for optimal selection of one or more visual features to be correlated with the audio to simulate the VRI session.

Figure 2B:
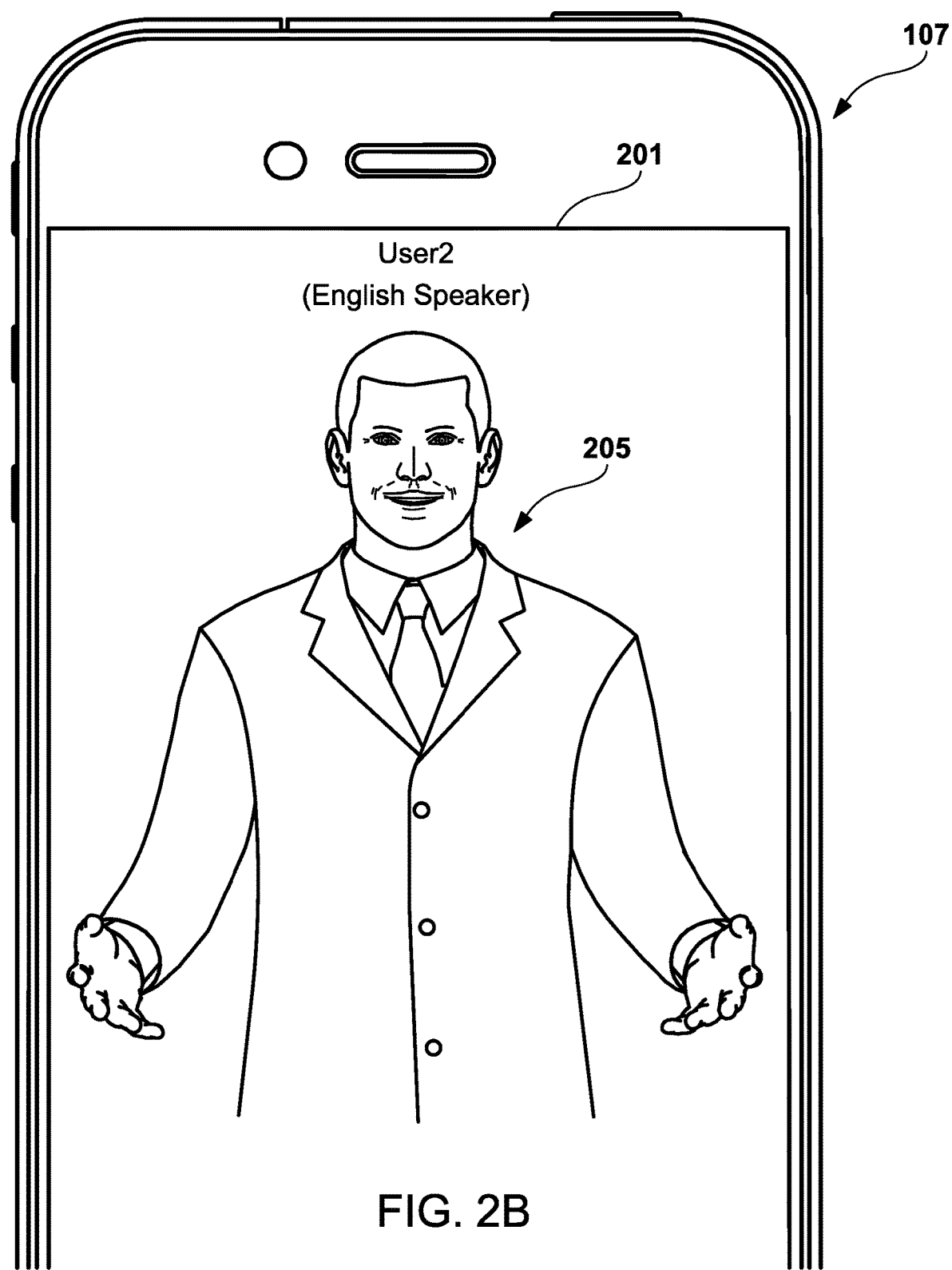
FIG. 2B illustrates the display screen rendering an avatar corresponding to the second user, who is an English speaking medical professional.
Figure 2C:
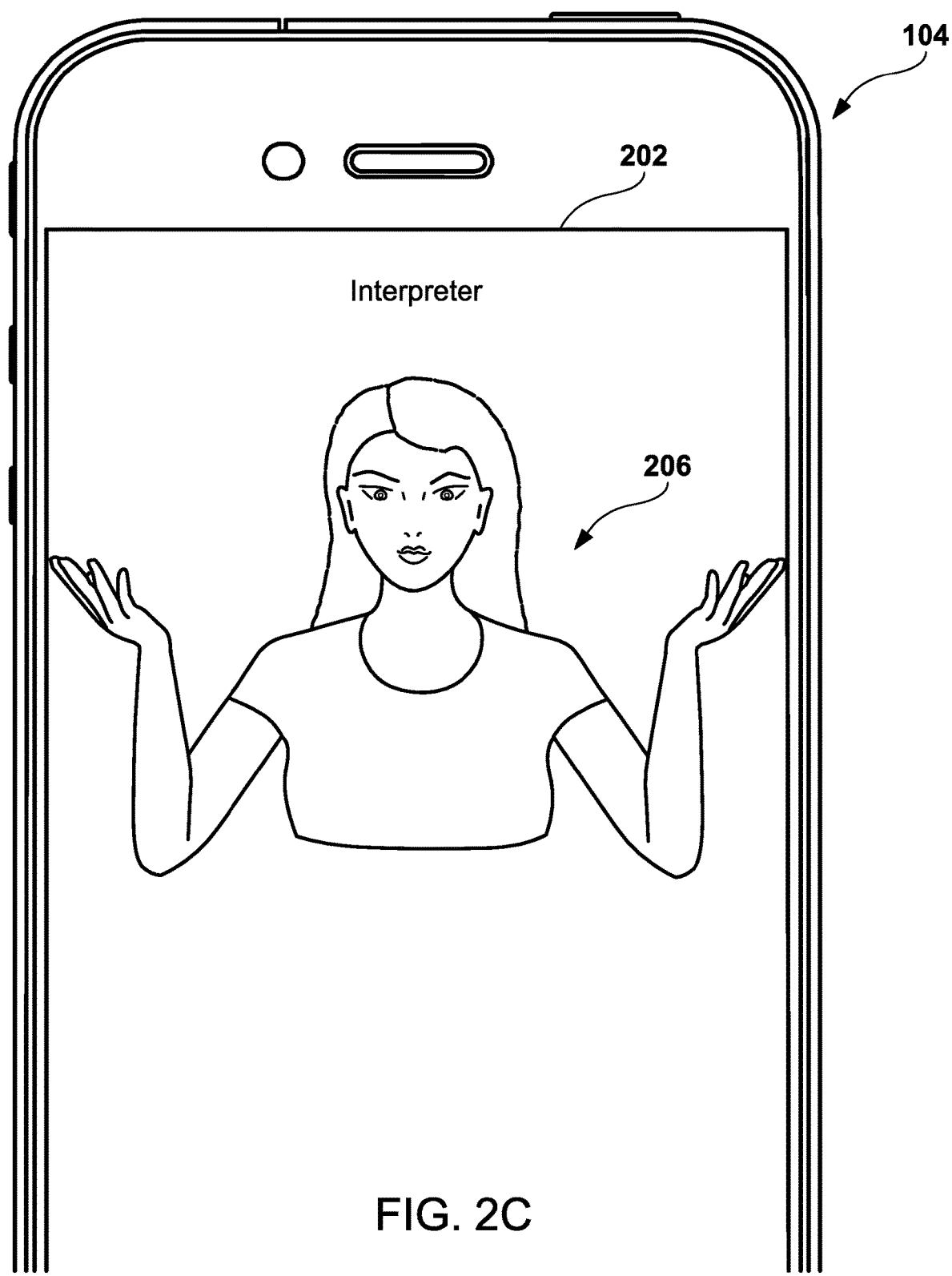
FIG. 2C illustrates an example of a display screen of the user telecommunication device that renders a simulated VRI session and depicts one or more visual features corresponding to the interpreter.

As another example, FIG. 2B illustrates the display screen 201 rendering an avatar corresponding to the second user 106, who is an English speaking medical professional. In response to the question of the first user 105, the second user 106 may state in a calming tone that the health of the first user 105 is fine. Through audio analysis, the VRI simulation engine 102 may select a claiming hand gesture to be displayed at the display screen 201. The interpreter 108 may view the context of such first user and second user communications to provide a better interpretation than could be performed by audio itself. Conversely, FIG. 2C illustrates an example of a display screen 201 of the user telecommunication device 104 that renders a simulated VRI session and depicts one or more visual features corresponding to the interpreter 108. For example, the VRI simulation engine 102 may determine (based on interpretation speed, the interpreter 108 requesting that the users 105 and 106 repeat things, tone, etc.) whether or not the interpreter 108 is following along with the discussion between the users 105 and 106. For example, an avatar 206 of the interpreter 108 may depict a smiley face to reassure the users 105 and 106 that the interpreter 108 is understanding the two languages, any field-specific nuances (e.g., medical terminology), the context, etc. In other words, the avatar 206 provides the users 105 and 106 with a gauge as to the level of understanding of the interpreter 108 during the conversation between the users 105 and 106. Accordingly, the users 105 and 106 may adjust various parameters (e.g., conversation speed, defining field-specific terminology, etc.) based on feedback as determined from the users 105 and/or 106 viewing the visual manipulations of the avatar 206.

In other embodiments, the manipulations of the avatars 204-206 illustrated in FIGS. 2A-2C may be determined in ways other than an audio analysis performed by the VRI simulation engine 102. For example, the users 105 and 106 may provide user inputs (e.g., via a menu displayed on the display screen 201) for a visual feature selection while, or shortly after, providing an audio input.

Figure 2D:
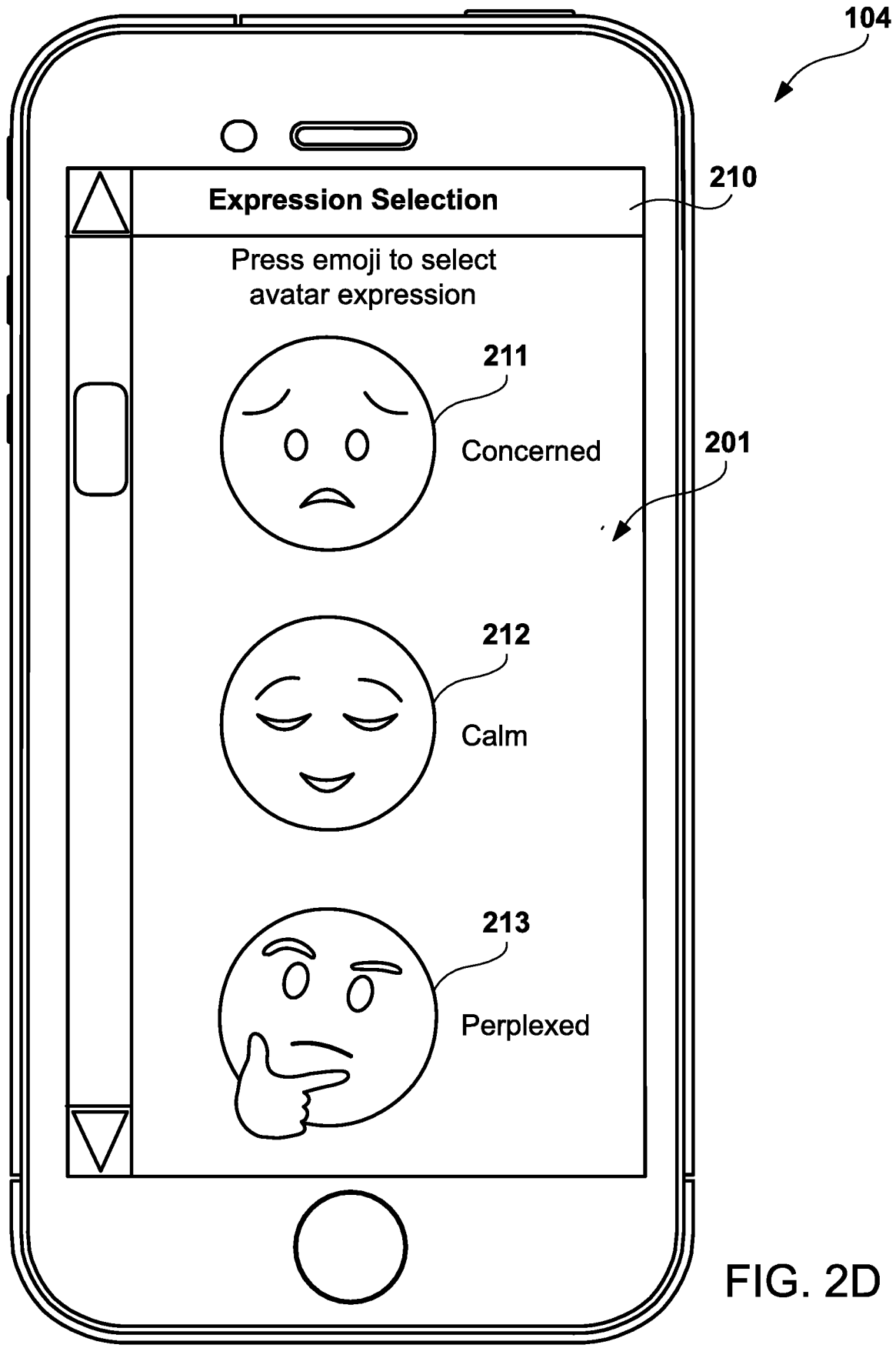
FIG. 2D illustrates an example of a graphical user interface ("GUI") displayed by the display screen of the user telecommunication device.

FIG. 2D illustrates an example of a GUI 210 displayed by the display screen 201 of the user telecommunication device 104. The GUI 210 displays various emoji corresponding to various expressions. For instance, the users 105 and/or 106 may provide a touch-screen input to select an avatar expression that the user 105 and/or 106 wants to be correlated with an audio input. For example, the user may select from a concerned emoji 211 (e.g., corresponding to the concerned user 105 illustrated in FIG. 2A), a calm emoji 212 (e.g., corresponding to the calm user 106 illustrated in FIG. 2B), and a perplexed emoji 213 (e.g., corresponding to the perplexed interpreter 108 illustrated in FIG. 2C). As a result of an emoji selection, the user device 104 may generate a visual feature to be sent to the interpreter telecommunication device 107. An expression associated with the emoji may be selected as a visual feature (e.g., an avatar expression such as in FIG. 2A, 2B, or 2C corresponding to the expression connoted by the emoji), or the emoji itself may be the visual feature. Similarly, the interpreter 108 may also generate avatar expressions for the avatar 206 that correspond to audio inputs from the interpreter 108. Further, emoji are just used as examples as other expression indicia may be utilized to receive user inputs for expression selection.

Accordingly, an avatar, or other representation of a user as viewed by the interpreter or of an interpreter as viewed by a user, may be manipulated to be displayed with various expressions based on audio analysis, user/interpreter inputs, and/or a combination of audio analysis and user/interpreter inputs.

In other embodiments, the recipient personalizes the avatar of the sender based on preferences for the manner in which the recipient wants the avatar of the sender displayed on the display screen of the sender. For example, the users 105 and/or 106 may select a particular avatar for the interpreter 108 to represent the manner in which the users 105 and/or 106 want to be view the avatar. Further, the recipient may also customize visual features, according to a rules-based configuration, to automatically correspond to one or more preferences. For example, the users 105 and 106 may have a preference for one type of smiley face as opposed to another.

Figure 3:
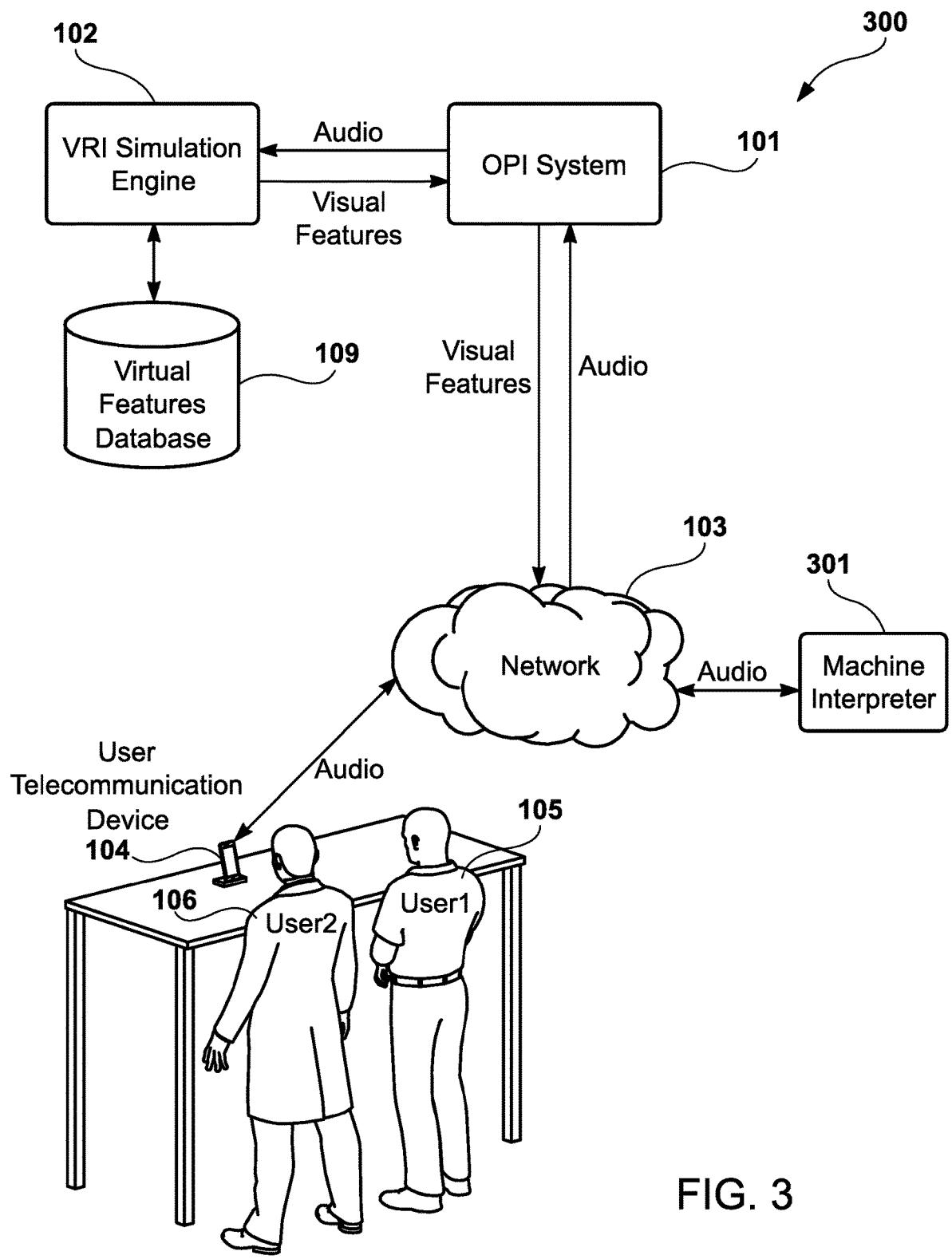
FIG. 3 illustrates a VRI simulation configuration in which a machine interpreter is utilized to perform human-spoken language interpretation in real-time, or in substantially real-time, of the conversation between the first user 105 and the second user.

In yet another embodiment, the VRI simulation configuration 100 illustrated in FIGS. 1A and 1B may be implemented with a machine interpreter of human-spoken languages rather than a human interpreter. FIG. 3 illustrates a VRI simulation configuration 300 in which a machine interpreter 301 is utilized to perform human-spoken language interpretation in real-time, or in substantially real-time, of the conversation between the first user 105 and the second user 106. The machine interpreter 301 may be in operable communication with, or integrated within, the OPI system 101.

In one embodiment, the VRI configuration 300 is utilized to provide the users 105 and/or 106 with a voice-based, human-spoken language interpreter that appears to have human-like gestures and/or expressions via a machine interpreter avatar. As a result, the VRI configuration 300 generates a voice-based interpretation that provides the users 105 and/or 106 with the appearance of a human-like interpretation experience.

In another embodiment, visual features may or may not be generated by the VRI simulation configuration 300 to correlate with the users 105 and/or 106. For instance, the users 105 and/or 106 may prefer to have a machine interpreter avatar with augmented visual features corresponding to generated audio interpretation, but such imagery of the users 105 and/or 106 may not necessarily be utilized by the machine interpreter 301. Alternatively, the machine interpreter 301 may perform an image analysis on the visual features depicted by the avatars 204 and 205 (FIGS. 2A and 2B) to contextualize the conversation between the users 105 and 106. Further, the machine interpreters 301 may utilize machine learning to adjust subsequent interpretations based on positive, neural, or negative feedback received from the users 105 and 106, as determined via image analysis of the augmented visual features.

The VRI simulation configuration 300 may not necessarily be limited to one user telecommunication device 104. Similar to the VRI simulation configuration 100 illustrated in FIG. 1B, the VRI simulation configuration 300 may be implemented with a user telecommunication device 104 for each user 105 and 106 (e.g., for users 105 and 106 remotely situated).

Further, none of the configurations provided for herein are limited to only two user devices 104. For instance, VRI simulation may be performed for voice-based, human-spoken language interpretation of three or more human-spoken languages.

Figure 4:
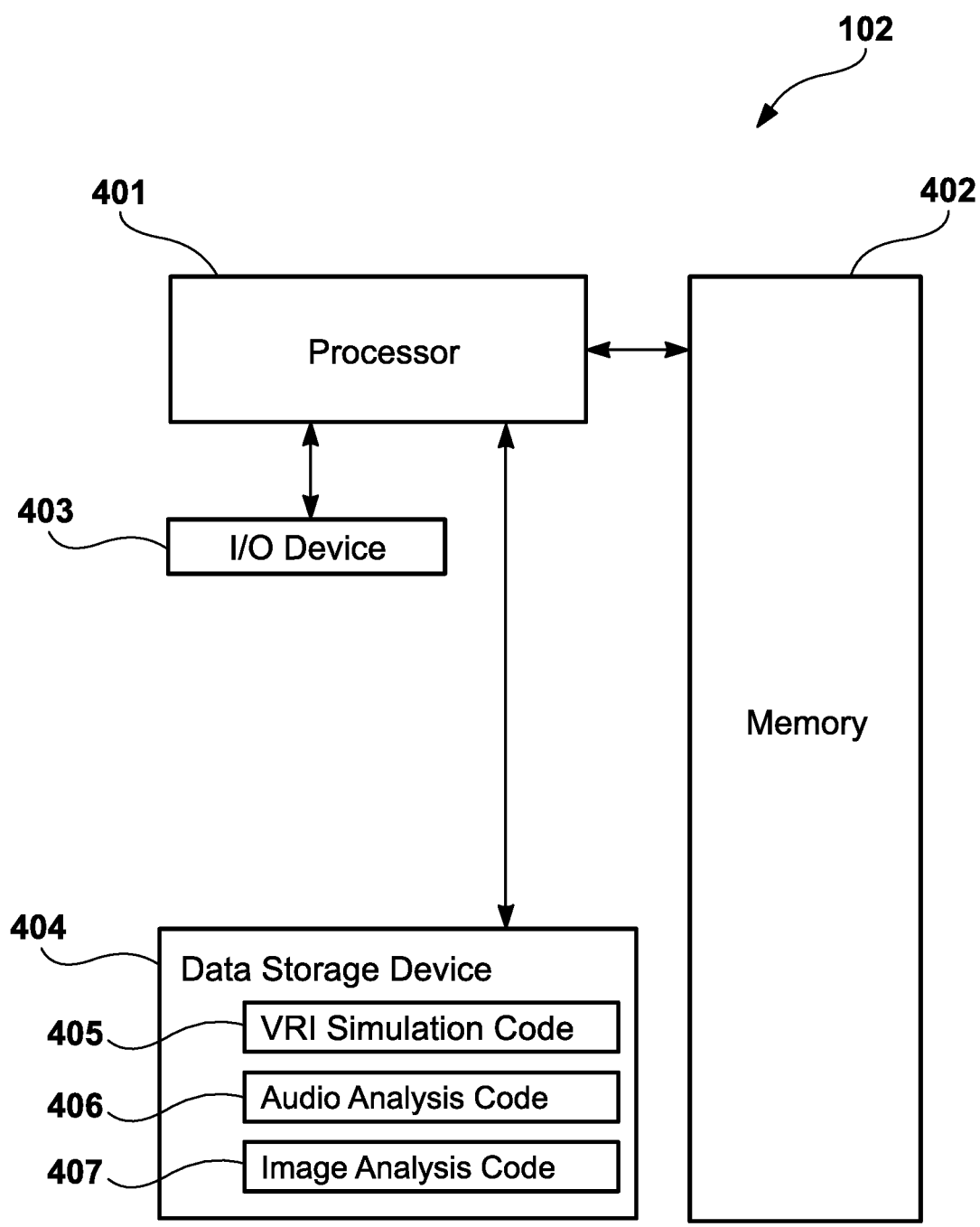
FIG. 4 illustrates the internal components of the VRI simulation engine illustrated in FIGS. 1A, 1B, and 3.

FIG. 4 illustrates the internal components of the VRI simulation engine 102 illustrated in FIGS. 1A, 1B, and 3. The VRI simulation engine 102 may include a processor 401, a memory 402, an input/output ("I/O") deice 403 (e.g., microphone, audio recorder, image capture device, keyboard, touch-screen, joystick, gesture detection device, etc.), and data storage device 404.

The data storage device 404 may include VRI simulation code 405, audio analysis code 406, and image analysis code 407. The processor 401 may execute the VRI simulation code 405 to augment an OPI session with visual features. In one embodiment, the processor 402 executes the audio analysis code 406 to determine the context of audio content and then select an optimal match of a visual feature that correlates most closely to that audio content. In yet another embodiment, the processor 402 executes image analysis code 407 to analyze generated visual features to improve performance based on machine learning.

Figure 5:
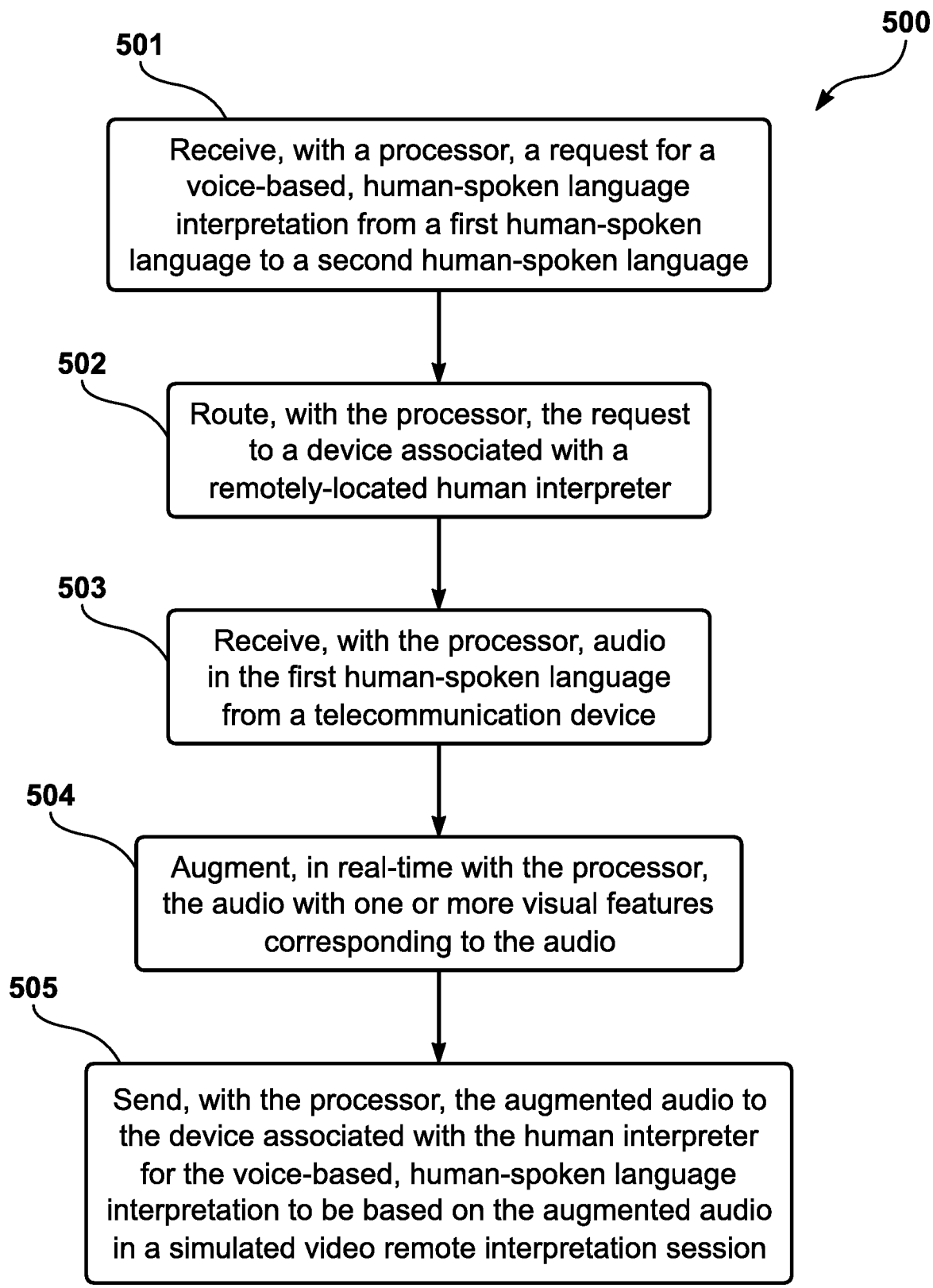
FIG. 5 illustrates a process that may be utilized to implement the VRI simulation performed by the VRI simulation engine illustrated FIG. 1.

FIG. 5 illustrates a process 500 that may be utilized to implement the VRI simulation performed by the VRI simulation engine 102 illustrated FIG. 1. At a process block 501, the process 500 receives, with a processor, a request for a voice-based, human-spoken language interpretation from a first human-spoken language to a second human-spoken language. Further, at a process block 502, the process 500 routes, with the processor, the request to a device associated with a remotely-located human interpreter. In addition, at a process block 503, the process 500 receives, with the processor, audio in the first human-spoken language from a telecommunication device. At a process block 504, the process 500 augments, in real-time with the processor, the audio with one or more visual features corresponding to the audio. Further, at a process block 505, the process 500 sends, with the processor, the augmented audio to the device associated with the human interpreter for the voice-based, human-spoken language interpretation to be based on the augmented audio in a simulated video remote interpretation session.

Although, the configurations provided for herein have been described with respect to human-spoken language interpretation, various other embodiments may allow for the configurations to be utilized for other forms of interpretation. For example, the interpretation may be performed from a human-spoken language (e.g., English) to American Sign Language ("ASL"), and vice-versa. Accordingly, the configurations provided for herein may also be used to provide support for users that are deaf and hard of hearing.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:
   receive, with a processor, a request for a voice-based, human-spoken language interpretation from a first human-spoken language to a second human-spoken language;
   route, with the processor, the request to a device associated with a remotely-located machine interpreter;
   receive, with the processor, audio in the first human-spoken language from a telecommunication device;
   perform, with the processor, an audio analysis of the audio to select one or more visual features from a plurality of visual features based on a match between the audio and the selected one or more visual features;
   augment, in real-time with the processor, the audio with the one or more visual features corresponding to the audio;
   send, with the processor, the augmented audio to the device associated with the machine interpreter for the voice-based, human-spoken language interpretation to be based on the augmented audio in a simulated video remote interpretation session;
   receive, with the processor, imagery captured by the telecommunication device, the imagery being of a user reaction to the one or more visual features;
   perform, with the processor, an image analysis of the imagery to determine the user reaction; and
   perform machine learning to adjust a subsequent human-spoken language interpretation based on the user reaction.

2. The computer program product of claim 1, wherein the computer is further caused to select the one or more visual features from a plurality of visual features based on a match between a feature of the audio and the selected one or more visual features.

3. The computer program product of claim 1, wherein the one or more visual features are inputted via a user interface at the telecommunications device.

4. The computer program product of claim 3, wherein the one or more visual features are inputted via one or more emoji at the telecommunications device.

5. The computer program product of claim 1, wherein the one or more visual features comprise a manipulation of an avatar based on the audio, the avatar being associated with a user of the telecommunications device.

6. The computer program product of claim 5, wherein the manipulation is a facial expression.

7. The computer program product of claim 5, wherein the manipulation is a hand gesture.

8. The computer program product of claim 5, wherein the manipulation is a shoulder shrug.

9. The computer program product of claim 1, wherein the one or more visual features comprise a manipulation of an avatar based on the audio, the avatar being associated with the human interpreter.

* * * * *